(12) United States Patent
Childress et al.

(10) Patent No.: US 7,840,567 B2
(45) Date of Patent: Nov. 23, 2010

(54) METHOD AND APPARATUS FOR DERIVING OPTIMAL PHYSICAL SPACE AND AMBIANCE CONDITIONS

(75) Inventors: Rhonda L. Childress, Austin, TX (US); David Bruce Kumhyr, Austin, TX (US); Michael John Spisak, East Northport, NY (US)

(73) Assignee: International Business Machines Corporation, Armonk, NY (US)

( * ) Notice: Subject to any disclaimer, the term of this patent is extended or adjusted under 35 U.S.C. 154(b) by 1347 days.

(21) Appl. No.: 11/333,517

(22) Filed: Jan. 17, 2006

(65) Prior Publication Data

US 2007/0168347 A1      Jul. 19, 2007

(51) Int. Cl.
G06F 17/30      (2006.01)
(52) U.S. Cl. .................. 707/748; 707/784; 707/758; 705/5; 705/10; 705/12
(58) Field of Classification Search .......... 707/748, 707/784, 758; 705/5, 10, 12
See application file for complete search history.

(56) References Cited

U.S. PATENT DOCUMENTS

| | | | |
|---|---|---|---|
| 6,741,969 B1 | 5/2004 | Chen et al. | |
| 6,868,261 B2 | 3/2005 | Shi et al. | |
| 7,283,990 B2* | 10/2007 | Goetz | 707/10 |
| 2001/0054004 A1* | 12/2001 | Powers | 705/14 |
| 2002/0120370 A1* | 8/2002 | Parupudi et al. | 709/203 |
| 2003/0088458 A1* | 5/2003 | Afeyan et al. | 705/10 |
| 2003/0130908 A1* | 7/2003 | Hing | 705/26 |
| 2003/0227439 A1 | 12/2003 | Lee et al. | |
| 2004/0023666 A1* | 2/2004 | Moon et al. | 455/456.1 |
| 2004/0161097 A1 | 8/2004 | Henry | |
| 2004/0198386 A1* | 10/2004 | Dupray | 455/456.1 |
| 2004/0215517 A1* | 10/2004 | Chen et al. | 705/14 |
| 2004/0230486 A1 | 11/2004 | Greenlee | |
| 2005/0043060 A1* | 2/2005 | Brandenberg et al. | 455/558 |
| 2005/0065851 A1 | 3/2005 | Aronoff et al. | |
| 2005/0080676 A1 | 4/2005 | Lovegreen et al. | |
| 2005/0114185 A1 | 5/2005 | Rodriguez et al. | |
| 2005/0283405 A1* | 12/2005 | Mallo et al. | 705/26 |
| 2006/0069749 A1* | 3/2006 | Herz et al. | 709/219 |
| 2008/0155453 A1* | 6/2008 | Othmer | 715/774 |

(Continued)

OTHER PUBLICATIONS

"Mobile Couponing—Measuring Consumers' Acceptance and Preferences with a limit Conjoint Approach"—K. Wehmeyer, C Muller-Lankenau—Conference Paper: 18th Bled eConference eIntegration in Action, Jun. 6-8, 2005 (pp. 1-20).*

(Continued)

*Primary Examiner*—John E Breene
*Assistant Examiner*—Anh Ly
(74) *Attorney, Agent, or Firm*—Yee & Associates, P.C.; Jeffrey S. LaBaw

(57) ABSTRACT

A computer implemented method, data processing system, and a computer program product are provided for deriving optimal physical space and ambiance conditions for a user. A physical space analyzer comprising an information sensor and an optimal space analyzer detects a broadcast of characteristics of a set of nearby physical spaces. In turn, the physical space analyzer produces a ranking of the set of nearby physical spaces using the characteristics based on preferences of the user as expressed by the user's profile. An ambiance optimizer is provided to refine the ranking of the set of nearby physical spaces based on dynamically input preferences of the user.

14 Claims, 5 Drawing Sheets

U.S. PATENT DOCUMENTS

2008/0233927 A1*  9/2008  Moon et al. ............... 455/414.1
2008/0270579 A1*  10/2008  Herz et al. .................. 709/219

OTHER PUBLICATIONS

"Mobile Electronic Commerce through the Web"—H. Oinas-Kukkonen—Proceedings of the Second International Conference on 1999 (pp. 1-6).*

Kathleen Carley—"An approach for relating social structure to cognitive structure" Journal of Mathematical sociology, 1986, vol. 12(2), (pp. 137-189).*

Zhang et al.—"A multi-Label voting algorithm for neuro-fuzzy classifier ensembles with applications in visual arts data mining"—proceedings of the 2005 $5^{th}$ International Conference on Intelligent Systems design and Applications (ISDA'05)—IEEE, 2005, (pp. 1-6).*

* cited by examiner

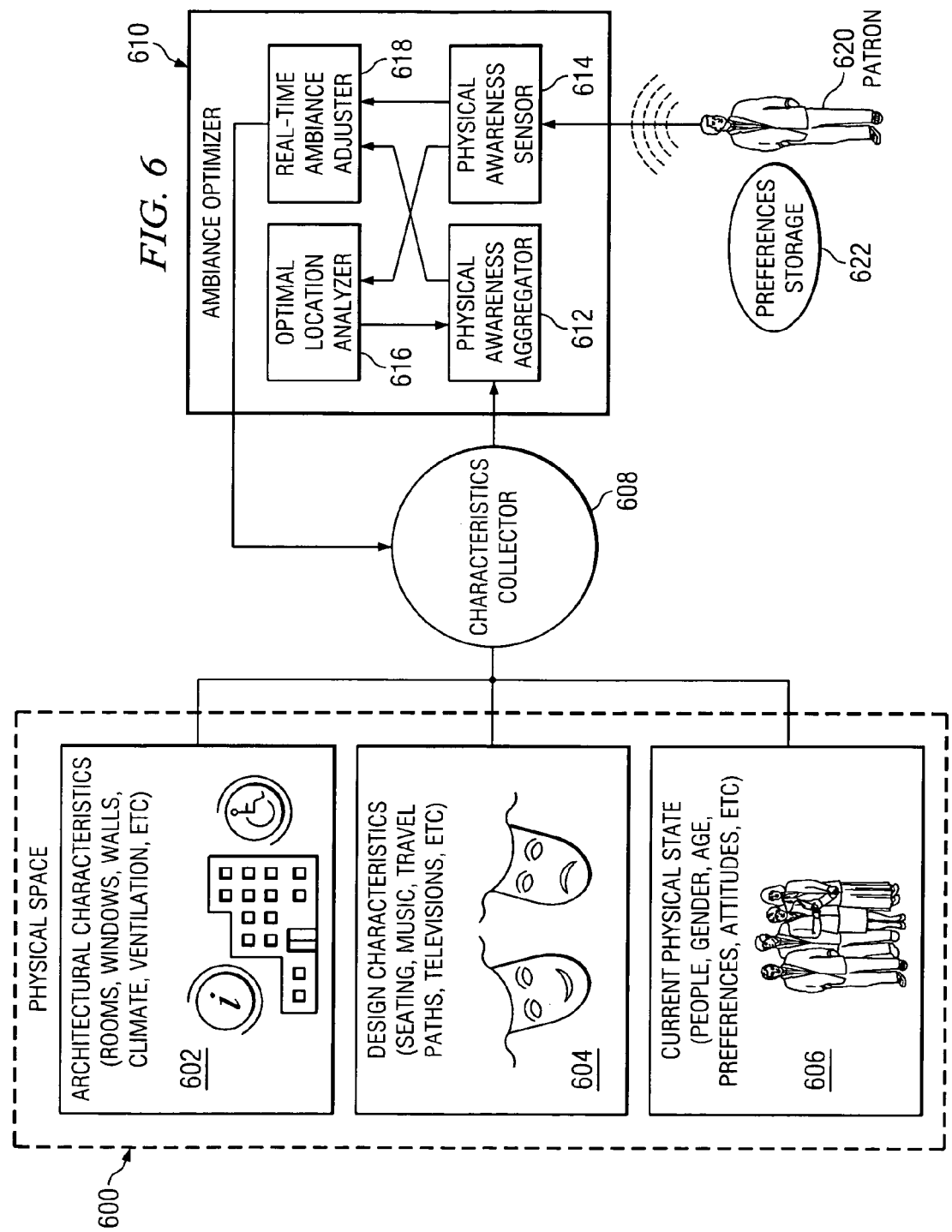

METHOD AND APPARATUS FOR DERIVING OPTIMAL PHYSICAL SPACE AND AMBIANCE CONDITIONS

BACKGROUND OF THE INVENTION

1. Field of the Invention

The present invention relates generally to a location-aware environment. In particular, the present invention relates to deriving optimal physical space and ambiance conditions in a location-aware environment. Still more particularly, the present invention relates to deriving optimal physical space and ambiance conditions based on user preferences and attitudes.

2. Description of the Related Art

Currently, when patrons enter an establishment, such as a restaurant or a coffee shop, the patrons usually state their preferences verbally to a facilitator, such as a host or a manager. Herein, such establishments are often referred to as "physical spaces." The preferences indicate how the patrons want to receive the services, for example, a desired location of the table, a desired type of music, a desired television channel, and the like. In the prior art, patrons typically find a most favorable location of the establishment by trial and error. For example, patrons may find their preferred seating arrangements by walking around the restaurant until they find a table in a secluded corner, away from the kitchen, near a band or other suitable conditions. In other cases, patrons may actually have to sit and eat at different tables to find one that meets their preferences. The location of one table may be too loud, while the location of another table consistently results in poor service. Actually dining at a table in a particular location, patrons determine whether the location meets their preferences.

While these methods allow the patrons to specify their preferences, in the prior art, most of the preferences can be addressed until the patrons arrive at the actual location in the establishment. For example, a table may be located in a non-smoking section, i.e. a preference, but there are children in the immediate area, an air conditioning vent may be directly blowing at the patron, or the area may be too dark, i.e. non-preferences. Furthermore, once the patrons are physically at an establishment, there may be reluctance on the part of the patrons to leave, even though all of their preferences cannot be met by the establishment.

In addition, the establishments themselves fail to adequately present the variety of options available, or those not available, so that patrons may decide which of the establishments are most suitable to their needs. Patrons currently have to physically travel to each establishment to determine whether the establishment is suitable for them. Traveling from establishment to establishment is time-consuming, and unless the patron has visited all establishments within the relevant area and has kept good notes, the optimal choice may still not be identified. While patrons may contact the establishments by phone to determine specific characteristics, contacting each and every establishment to determine real time characteristics is not practical. Thus, the prior art fails to adequately address the problem of choosing the best establishment within a specified environment reflecting an optimal choice according to the preferences of a respective patron or group of patrons.

SUMMARY OF THE INVENTION

The aspects of the present invention provide a computer implemented method, data processing system and computer program product for deriving optimal physical space and ambiance conditions for a user. A broadcast of characteristics of a set of nearby physical spaces is detected. Using the characteristics of the user as expressed by the user's profile, a ranking is produced of the set of nearby physical spaces. The ranking of the set of nearby physical spaces is refined based on dynamically input preferences of the user.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a diagram illustrating operations of a characteristics collector and ambiance optimizer in accordance with an illustrative embodiment of the present invention.

DETAILED DESCRIPTION OF THE PREFERRED EMBODIMENT

Figure 1:
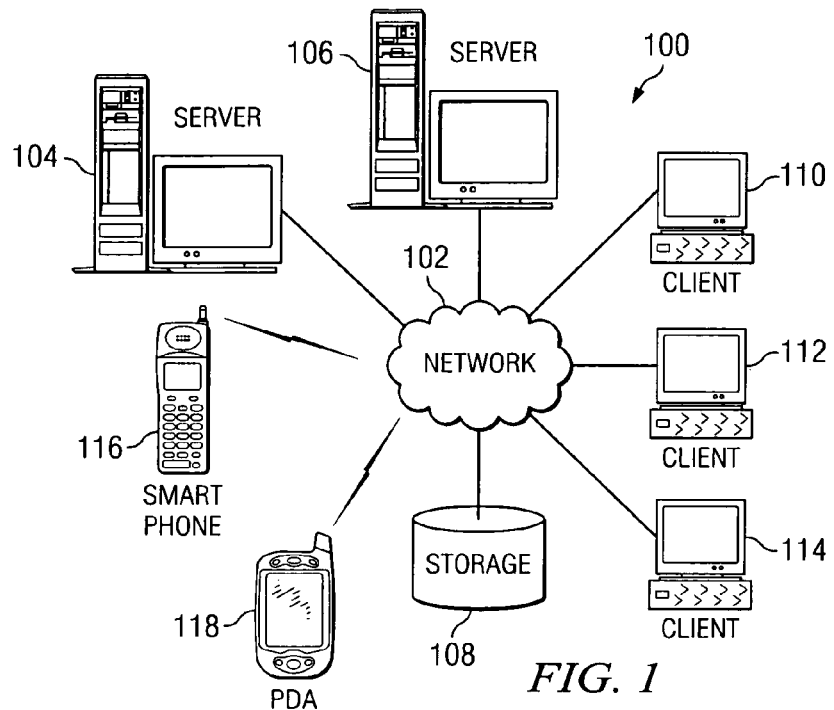
FIG. 1 is a pictorial representation of a network of data processing systems in accordance with an illustrative embodiment of the present invention.
Figure 2:
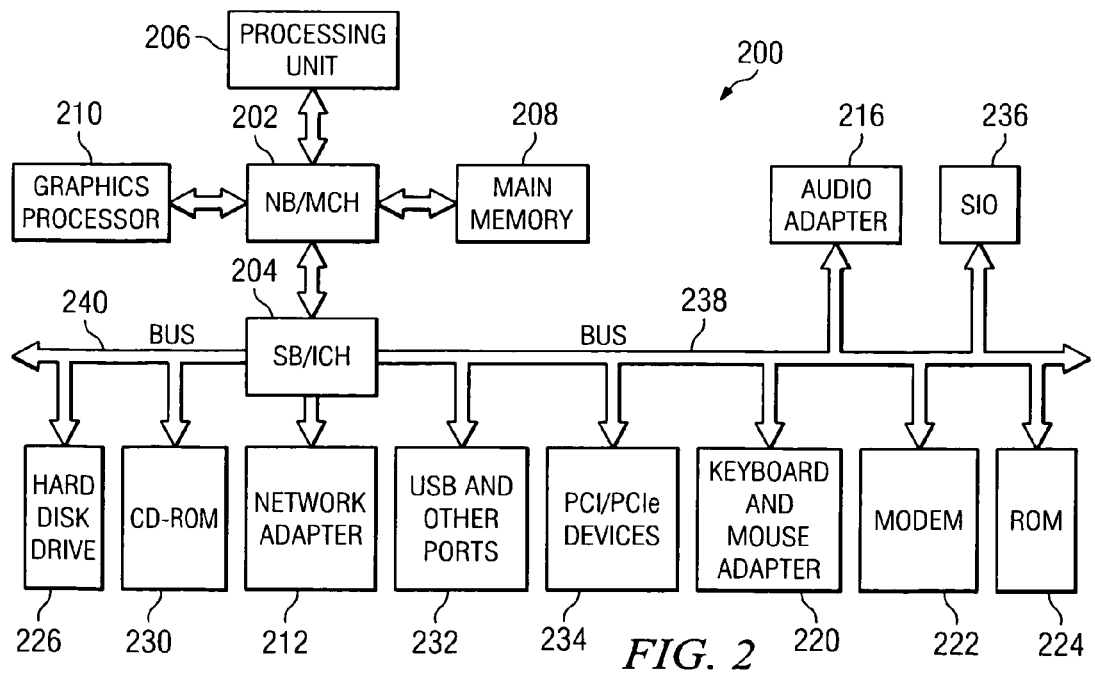
FIG. 2 is a block diagram of a data processing system in accordance with an illustrative embodiment of the present invention.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communication links between various devices and computers connected together within network data processing system 100. Network 102 may include connections, such as wire, wireless communication links, or fiber optic cables.

In the depicted example, server 104 and server 106 connect to network 102 along with storage 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices, such as smart phone 116 and personal digital assistant (PDA) 118.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, network adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other ports 232, and PCI/PCIe devices 234 connect to SB/ICH 204 through bus 238 and bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as, the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be PDA 118 in FIG. 1, which is a device configured with flash memory to provide non-volatile memory for storing operating system files and/or user-generated data. Data processing system 200 may also be a smart phone, such as smart phone 116 in FIG. 1.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or network adapter 212 as shown in FIG. 2. A memory may be, for example, main memory 208, ROM 224, or a cache such as found in NB/MCH 202 as shown in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Aspects of the present invention provide a computer implemented method, data processing system, and computer program product for locating an optimal physical space based on user preferences and attitudes. Preferences are relatively long-termed, i.e. part of a user's profile, while attitudes are short-termed, i.e. a current preference. An example of a preference might be to always sit near a window, while an example of an attitude might be the choice of Mexican food for one particular meal. In the context of the present invention, physical space refers to physical locations, such as, for example, restaurants, bars, coffee houses, grocery stores, and libraries. One aspect of the present invention provides the capability to broadcast real-time specific characteristics about the current environment within a specified physical space of an establishment. Users may analyze the broadcasts based on the type of physical spaces they are interested in visiting, either through a subscription to a service or as an offered service of the establishment. The results of received broadcasts are then ranked based on the users' personal preferences and their attitudes towards those preferences to determine a best possible physical space to visit in real time.

For example, a user may be walking in a busy food district area of a city and wants to consume a hamburger and a beverage for lunch. Since the district is very busy, the user is also concerned with wait time. The user's current attitude towards wait time, however, is secondary to a preference of listening to good music in a pub-like environment. The user uses a requester device with a physical space analyzer containing the user's preferences and current attitudes towards those preferences. A connection to optimized establishment information may then be established by the physical space analyzer with all physical spaces that will satisfy the user's basic requirements of a hamburger and a beverage, while also satisfying the user's current attitude of good music. More details regarding this scenario are discussed in FIG. 5 below.

Another aspect of the present invention provides a data processing system and computer program product for creating optimal ambiance conditions based on the present conditions for potential clientel. This aspect of the present invention provides the capability to detect and determine an optimal location within an establishment based on a variety of options, including time, temperature, music, who and what is in the current environment, and more importantly, the patrons' preferences. Furthermore, this aspect of the present invention adjusts the environment in order to accommodate the patrons' preferences.

For example, a bar establishment may have a jukebox music player with a diverse selection of music. When the patron enters the bar, the establishment's optimizing device may detect that the patron as well as other patrons at the bar have a preference towards "60's music". Based on the preferences of all patrons and attitudes towards those preferences, the ambiance optimizer may instruct the jukebox to queue up music that is most likely tolerated by all patrons at the bar.

Thus, aspects of the present invention provide two phases: a locating phase and an optimizing phase. The locating phase includes the original location of the best establishment using the currently advertised parameters. The optimizing phase includes optimizing the establishment for the current patrons of the establishment. Other aspects of the present invention combine the two phases, such as when an establishment offers to optimize, using the optimizing phase, the ambiance if a respective customer commits to a reservation, using the locating phase. Another aspect might be locating the optimal place in the restaurant; however, unlike the locating phase, the patron is already in the establishment. Thus, the locating and optimizing phases may have to operate together to determine the best location within a particular establishment that might require some ambiance optimization. However, in optimizing the ambiance, the establishment has to consider the patrons already within the establishment.

Figure 3:
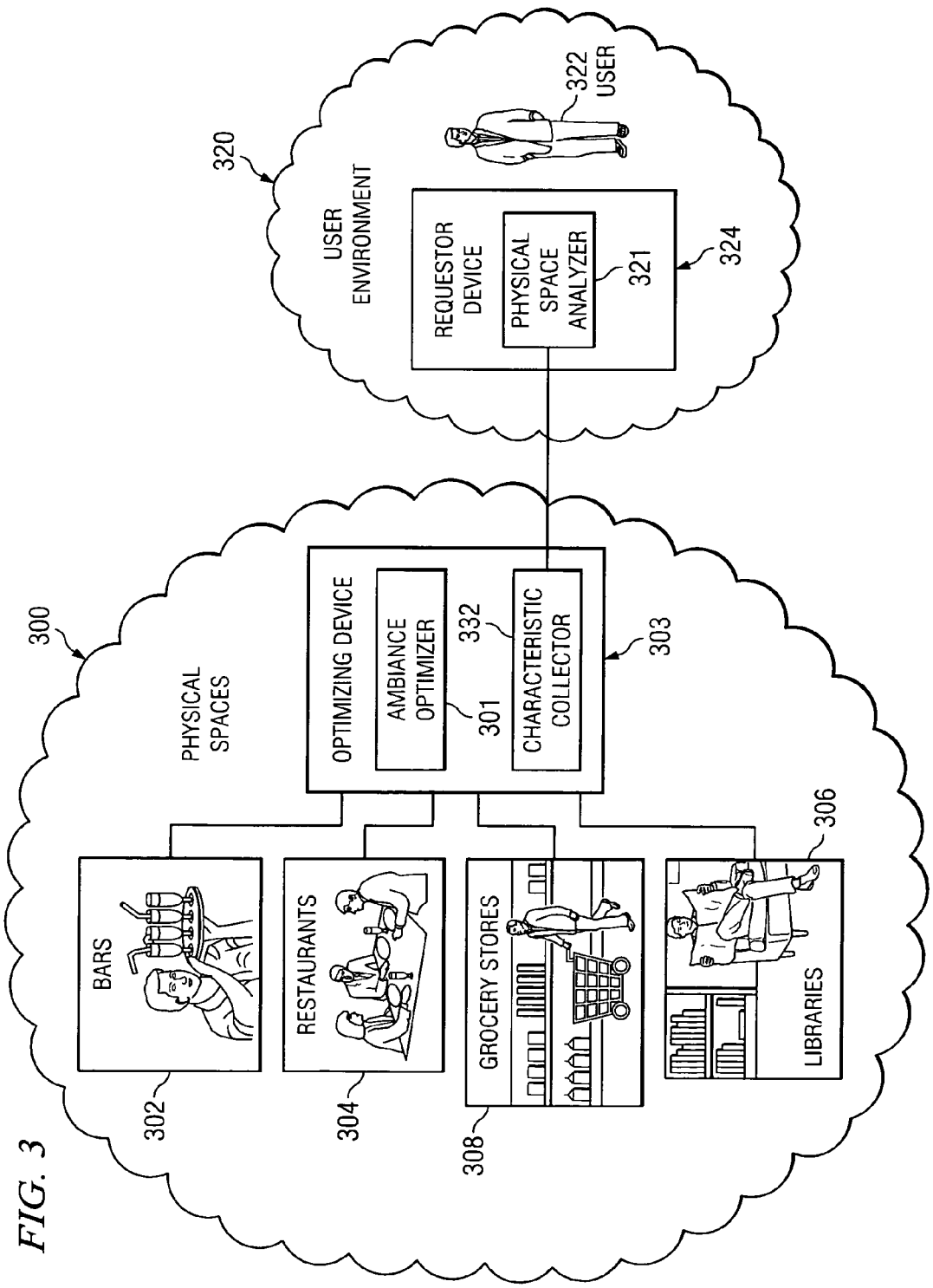
FIG. 3 is a diagram illustrating an environment in which aspects of the present invention derives an optimal physical space and ambiance conditions in accordance with an illustrative embodiment of the present invention.

Turning now to FIG. 3, a diagram illustrating an environment in which aspects of the present invention derives an optimal physical space and ambiance conditions is depicted in accordance with an illustrative embodiment of the present invention. As shown in FIG. 3, physical spaces 300 may include establishments such as bars 302, restaurants 304, libraries 306, and grocery stores 308. In one aspect of the invention, an establishment may have optimizing device 303 that is running ambiance optimizer 301. Ambiance optimizer 301 contains information about each establishment in physical spaces 300. Ambiance optimizer 301 may be implemented as an application within optimizing device 303, in each of physical spaces 300. Optimizing device 303 may be a client device, such as client 110 of FIG. 1, within an establishment in physical spaces 300, or a server, such as server 104 of FIG. 1. In a server implementation, optimizing device 303 using ambiance optimizer 301 may be able to remotely gather information from one or more of physical spaces 300.

Additionally, characteristic collector 332 may also be implemented in optimizing device 303. Characteristics collector 332 may be implemented using an Ethernet adapter, wireless communications adapter, or other suitable means of obtaining information, such as preferences, from a user or from a device. Characteristic collector 332 collects dynamic changes in the current environment of each of physical spaces 300, such as music that is currently featured, seating arrangements, or menu specials. Environmental changes may be input by a restaurant employee, detected though a monitoring device such as a microphone, or computerized detections of a television or radio setting, although other types of change input and detection may also be used. Using the collected characteristics of the establishment and need preferences of patrons, ambiance optimizer 301 is able to optimize the information of the establishment.

User 322 in user environment 320 may then be able to access optimizing device 303 to obtain the optimized information from ambiance optimizer 301. User 322 may have requestor device 324 that uses physical space analyzer 321, which may be implemented as an application within requestor device 324. Although requestor device is typically a handheld device, requester device 324 may be any client device such as client 110, client 112, client 114, smart phone 116, and PDA 118 in FIG. 1. User 322 defines his or her preferences in physical space analyzer 321. Then using the preferences in physical space analyzer 321 and information from ambiance optimizer 301, a determination may be made of an optimal physical space that suits user 322.

In an additional aspect of the present invention, ambiance optimizer 301 may continuously send optimized information via a broadcast message to any requestor device 324 that is within the vicinity of optimizing device 303. Such a feature may be implemented using a short range transmitter that would transmit the information only to those devices, such as requestor device, such as requestor device 324, within a certain range of the optimizing device 303. If requestor device 324 subscribes to an ambiance optimizing service, this device receives the information from optimizing device 303 when requestor device 324 is within the vicinity of optimizing device 303. The information obtained from optimizing device 303 is then filtered using user preferences for user 322 and presented to user 322.

Figure 4:
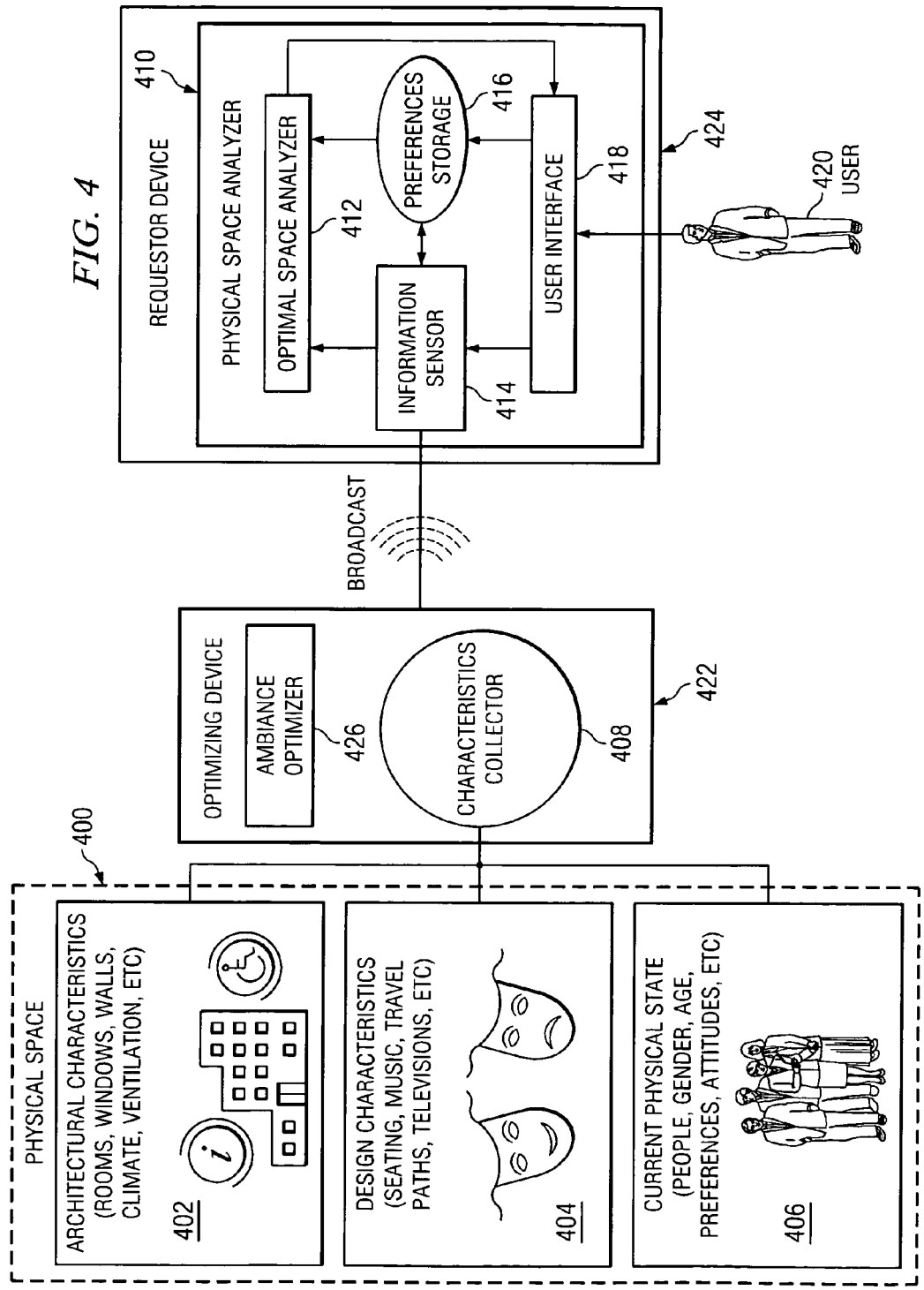
FIG. 4 is a diagram illustrating the operations of an optimizing device and requestor device in accordance with an illustrative embodiment of the present invention.

Turning now to FIG. 4, a diagram illustrating the operations of an optimizing device and a requestor device is depicted in accordance with an illustrative embodiment of the present invention. As shown in FIG. 4, one aspect of the present invention provides optimizing device 422. Optimizing device 422 may be implemented a location-based service mechanism which an establishment uses to broadcast characteristics of the establishment's physical space 400. In an illustrative embodiment, characteristics collector 408 collects data based on detected changes of the various characteristics of physical space 400 and updates any changes in a database for physical space characteristics. Some space characteristics are relatively invariant. These characteristics may include, for example, architectural characteristics 402, design characteristics 404, and current physical state 406 of physical space 400. Architectural characteristics 402 include architectural layout of physical space 400, such as location of rooms, windows, walls, climate ventilation, doorways, lighting, restrooms, and the like.

Design characteristics 404 include design layout of physical space 400, such as seating classifications, music selection, travel paths, ambiance specifics. Some examples of seating classifications in a restaurant include booths, stools, benches, smoking, non-smoking, bar, restaurant area, and the like. Some examples of travel paths in a restaurant include routes to the kitchen, exits, restrooms, and the like. Some examples of ambiance specifics in a restaurant include music volume, music types, television locations, television channels, and the like. These different ambience specifics are ones that allow for identifying locations with physical space 400. Current physical state 406 of physical space 400 include the number of people inside or in line, which may be further classified by age, gender, and preferences, such as smoking preference, and the like. The current physical state demographics may be collected through monitoring of the number of food orders, electronic seating from a hostess input pane, or a manual count from a hostess or wait staff. The further classifications may be made by the optimizer estimating the age and gender based on food and drink orders, input by a host or wait staff who estimated age and gender, seating in smoking and non-smoking areas based on electronic seating, or food orders based on table numbers. Characteristics other than those shown or described may be used depending on the particular implementation.

Characteristics collector 408 collects the above characteristics of physical space 400 though input from a manager or an employee associated with the establishment, as well as, through monitors, such as microphones or thermostats associated with the establishments. Optimizing device 422 then uses ambiance optimizer 426 to optimize the establishment characteristics collected by characteristics collector 408 and transmits the information via broadcast messages to users that are in the vicinity of physical space 400. While optimizing device 422 may transmit establishment information via broadcast messages to users that are in the vicinity of physical space 400, some of optimizing devices 422 may merely broadcast the current conditions of the physical space of the establishment and not optimized that ambiance of the establishment. Thereby, leaving the user with a "take it or leave it" option. The messages that are broadcasted may be formatted using a markup language, such as extensible markup language (XML). The structure of the message may be defined by the establishment using a schema, such as an extensible schema definition (XSD) schema. However, other formats and structures may be implemented without departing the spirit and scope of the present invention.

Another aspect of the present invention provides a requester device 424 using a physical space analyzer 410. Requestor device 424 detects the broadcast messages sent by optimizing device 422 and determines an optimal physical space for user 420 based on the user's preferences and attitudes. Requestor device 442 filters the detected broadcast messages sent by optimizing devices 422 to a set of physical spaces that are within some selected distance from requester device 424, such as 2 blocks, 5 miles, or within the city limits of a city. In an illustrative embodiment, physical space analyzer 410 may be implemented as an application within requestor device 424, which may be client 110, PDA 118, or smart phone 116 in FIG. 1.

User 420 may specify user preferences and attitudes in preferences storage 416 via user interface 418. Preferences storage 416 collects user preferences and attitudes for an optimal physical space at a given time. For example, user 420 may specify a preference for free wireless Internet access at a coffee house, with a temperature of 75 degrees, and a table nearest to the exit.

Based on the location of user 420, information sensor 414 automatically detects broadcasts messages sent from various space characteristics objects that are within the range of user 420. Information sensor 414 may be implemented using a global positioning system (GPS) module within requester device 424. Alternatively, information sensor 414 may be implemented as a wireless access client with a wireless network adapter. Information sensor 414 may poll periodically all optimizing devices 422 that are within the range of requestor device 424. Alternatively, user 420 may control via user interface 418 when requestor device 424 is activated.

Based on user preferences and attitudes specified in preferences storage 416 and optimizing device 422 that are detected by information sensor 414, optimal space analyzer 412 executes a series of algorithms to compare the information obtained from optimizing device 422 to user preferences and attitudes specified in preferences storage 416 and derives an optimal physical space that best suits the user preferences and attitudes.

One example of an algorithm finds information containing optimized characteristics that have been sent from optimizing devices 422 to information sensor 414. The algorithm then ranks each of the space characteristics based on user preferences and attitudes in preferences storage 416. The algorithm then returns a list of ranked space characteristics that satisfy all of the user preferences and attitudes. Alternatively, the algorithm may return only the top ranked space characteristics in the list. At this point, user 420 may also receive additional information from optimizing device 422 via requestor device 424, such as a web page, a menu, etc. Optimizing device 422 may send the information directly to requester device 424 or redirect user 420 to the Internet rather that transmitting all of the information via optimizing device 422.

Figure 5:
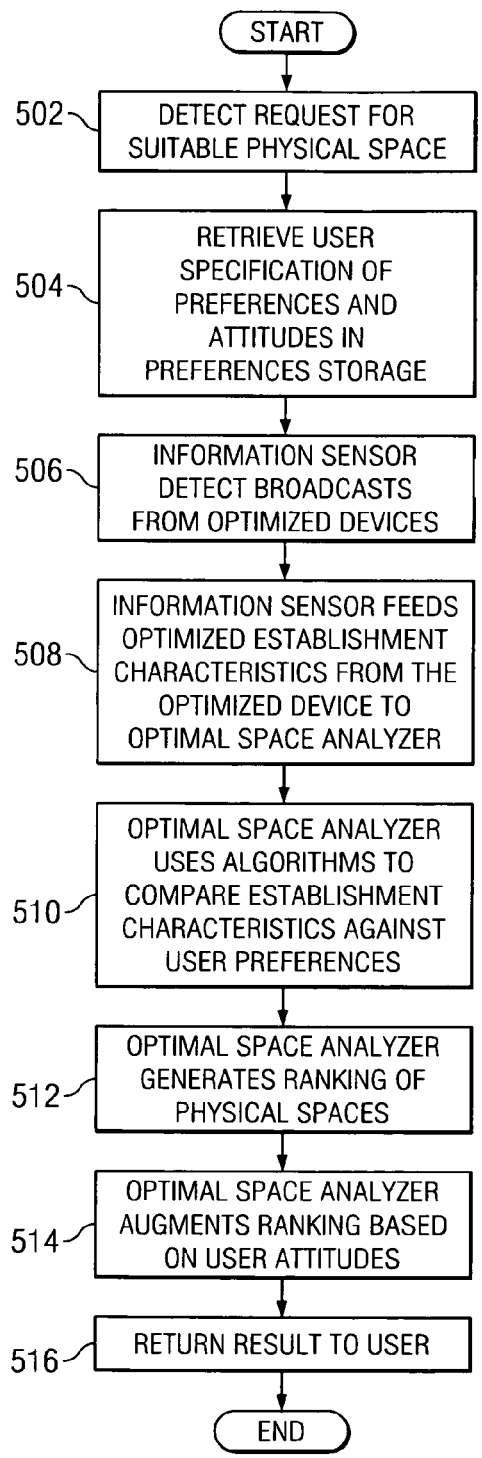
FIG. 5 is a flowchart of an operation for locating an optimal physical space for a user based on user preferences and attitudes in accordance with an illustrative embodiment of the present invention.

Turning now to FIG. 5, a flowchart of an operation for locating an optimal physical space for a user based on user preferences and attitudes is depicted in accordance with an illustrative embodiment of the present invention. This operation may be implemented within physical space analyzer, such as physical space analyzer 410 in FIG. 4. As shown in FIG. 5, from the perspective of the physical space analyzer, the operation begins when a user request for a suitable physical space is detected in the information sensor of the physical space analyzer via the user interface of a requestor device (step 502). The user submits a request for broadcasts from optimizing devices, such as optimizing device 422 of FIG. 4, in order to find a physical space with certain characteristics, for example, a certain type of food and beverage. The optimizing device may either respond to the request for the broadcast by transmitting one broadcast message or may already be transmitting broadcast messages on a continuous basis. The requester device detects broadcast messages sent by the optimizing devices from a set of physical spaces that are within some selected distance from the requestor device, such as 2 blocks, 5 miles, or within the city limits of a city.

Next, the physical space analyzer retrieves a user specification of preferences stored in the preferences storage by the user (step 504). In addition to specifying the preferences in the preferences storage, the user may alter or update the preferences stored in the preferences storage at any time via the user interface. Thus, the preferences may be dynamically input by the user Information sensor of the physical space analyzer then detects broadcasts from optimizing devices within the range of the user (step 506) and feeds optimized establishment characteristics from the optimizing device to the optimal space analyzer (step 508). The optimal space analyzer then uses algorithms to compare the optimized establishment characteristics of the optimizing device against the user's preferences (step 510) and generates a ranking of physical spaces that matches the user's preferences (step 512). For example, a user may desire a physical space that provides a specific type of food and beverage, within a specific geographical area, a wait time under five minutes, and with ambiance music of punk rock. One algorithm may select physical spaces that have these criteria and ranks the selected physical spaces based on which physical space can satisfy the highest number of criteria.

In addition, the optimal space analyzer augments the ranking of physical spaces based on user's current attitudes towards the preferences (step 514). For example, the optimal space analyzer may originally rank "Joe's burger" as the optimal physical space because it has the type of hamburger and beverage and the type of music the user desires. However, from the optimized establishment characteristics of that establishment, the optimal space analyzer detects that "Joe's burger" is currently holding a child's birthday party composed of 10 children and 3 adults. Upon finding a current state of "child's party" in the establishment, the optimal space analyzer examines user's current attitude as expressed by the preferences for "child's party." In finding that the user's preference of music is lower than the user's preference for avoiding "child's party", the analyzer selects "Mary's burger" as the optimal physical space, because all basic user preferences are satisfied with the exception of the type of music, instead of selecting "Joe's burger" as the optimal physical space. Finally, after an optimal physical space is determined, the optimal space analyzer returns the result to the user via the user interface (step 516), with the operation terminating thereafter. The result may include directions to the establishment or a may indicating the location of the establishment.

Thus, with the physical space analyzer of the present invention, user preferences are considered in determining an optimal physical space. In addition, a user's current attitude towards preferences stored in user's profile dynamically affects the ranking process of physical spaces, but yet the physical space analyzer accommodates such changes.

As discussed above, in addition to a physical space analyzer, another aspect of the present invention provides an ambiance optimizer within an establishment or physical space that detects and determines an optimal location for the patrons based on a variety of options and the patrons' preferences. Turning now to FIG. 6, a diagram illustrating operations of a characteristics collector and ambiance optimizer is depicted in accordance with an illustrative embodiment of the present invention. As shown in FIG. 6, this aspect of the present invention provides characteristics collector 608, which is similar to characteristics collector 408 in FIG. 4 and also collects data of various characteristics in physical space 600. These characteristics include architectural characteristics 602, design characteristics 604, and current physical state 606 of physical space 600. These characteristics are subject to change as the environment of physical space 600 changes. Characteristics collector 608 may be implemented as an application running within a data processing system, such as optimizing device 303 in FIG. 3, in an establishment, such as a restaurant.

Characteristics collector 608 collects the data and directly feeds the data to ambiance optimizer 610. Ambiance optimizer 610 may also be implemented in the same data processing system, such as optimizing device 303 in FIG. 3, in the same establishment.

In addition to establishment characteristics data received from characteristics collector 608, ambiance optimizer 610 may also collect properties of attributes that are within the establishment characteristics. For example, a jukebox attribute within the design characteristics of a restaurant may have an exposed interface that ambiance optimizer 610 may interact with. In that case, ambiance optimizer 610 may collect data from any property of attributes that are within the characteristics as long as either an interface is specified or a description of the interface is specified.

Ambiance optimizer 610 is a presence-sensing mechanism that processes user preferences against the characteristics of physical space 600 sent from characteristics collector 608 and determines an optimal location within physical space 600. Similar to physical space analyzer 410 in FIG. 4, user attitudes towards the preferences may further define the optimal location. In an illustrative embodiment, ambiance optimizer 610 includes four components: physical awareness aggregator 612, physical awareness sensor 614, optimal location analyzer 616, and real-time ambiance adjuster 618.

Physical awareness aggregator 612 facilitates consistency between characteristics collector 608 and the environment of physical space 600. In addition, physical awareness aggregator 612 facilitates rapid querying of the environment for other components of the ambiance optimizer 610. On the other hand, physical awareness sensor 614 detects the personal preferences of patron 620 within the context of the establishment, for example, a desired type of music, a desired type of seating, and the like. Preferences of patron 620 may be stored in preferences storage 622. In one illustrative embodiment, physical awareness sensor 614 may be implemented as part of a device of patron 620, which has a preference broadcaster that broadcast the preferences. In another illustrative embodiment, physical awareness sensor 614 may be implemented as a card-reader kiosk that patron 620 swipes when entering the establishment.

Once physical awareness sensor 614 detects a broadcast or receives personal preferences of patron 620, physical awareness sensor 614 passes the data to optimal location analyzer 616. Optimal location analyzer 616 performs a voting algorithm based on the preferences collected by physical awareness sensor 614 and real time characteristics data provided by physical awareness aggregator 612. Optimal location analyzer 616 then provides a variety of options that represent optimal locations for patron 620 within the establishment given the current state of the environment. These options are then returned to a number of recipients, including the host, patron 620, or an external system, in a number of formats, such as files, XMLs, and the like. With the options of optimal locations, patron 620 may select an optimal location to reside or visit.

Once the optimal location is determined, physical awareness sensor 614 may take the collected personal preferences and feed them to real-time ambiance adjuster 618. Real-time ambiance adjuster 618 can then review the collected "adjustable" characteristics of the environment obtained from characteristics collector 608 and tailor the environment of the establishment to a state that is tolerable by all patrons according to all patrons' collective attitudes.

For example, patron 620 enters a restaurant with a preference of a cooler temperature. However, the temperature preference is secondary to patron's current attitude of avoiding direct sunlight. Given the state of the current environment collected by physical awareness aggregator 612, optimal location analyzer 616 may determine that the optimal location is at the back corner near a heating vent. Because the patron is now sitting near a heating vent, real-time ambiance adjuster 618 may adjust the temperature to lower the temperature due to a flexible attitude of other patrons in the restaurant with regard to temperature. Thus, real-time ambiance adjuster 618 dynamically adjusts the environment of the establishment based on the optimal locations and preferences of other patrons.

In another example, patron 620 may wish to watch sports at a bar. While the optimal location analyzer 616 provides an optimal location, the television at that location is not showing a sports channel due to preferences of other patrons. Real-time ambiance adjuster 618 may sense the departure of those patrons and automatically changes the channel selection to a sports channel to suit the preference of patron 620 once those patrons depart.

Figure 7:
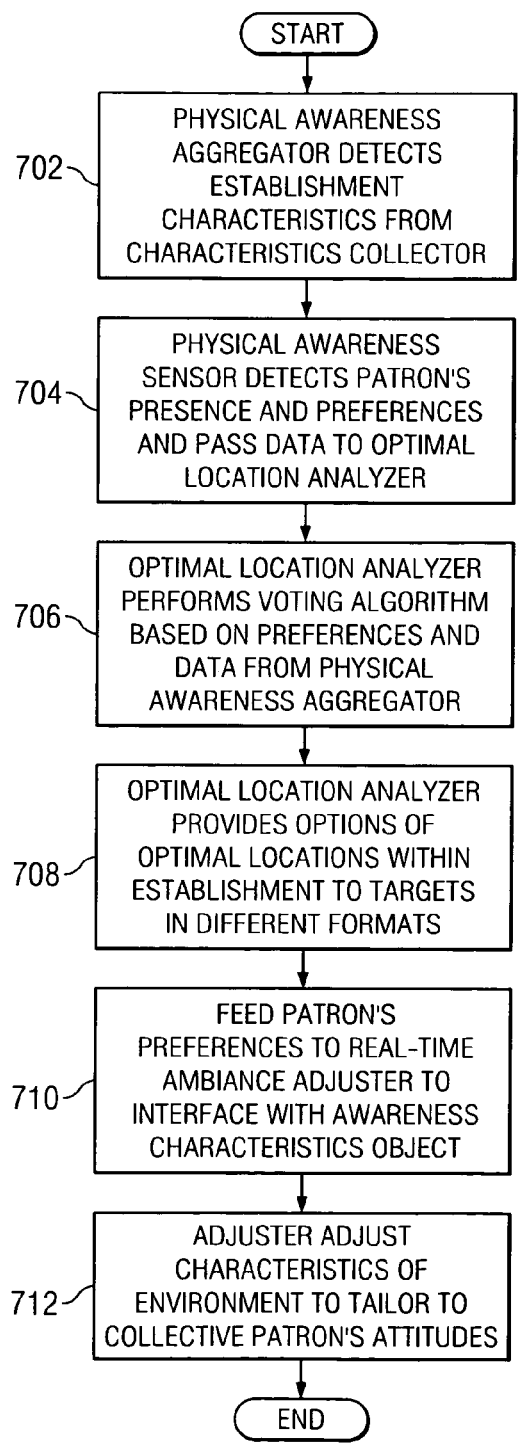
FIG. 7 is a flowchart of an operation for deriving optimal ambiance conditions in accordance with an illustrative embodiment of the present invention.

Turning now to FIG. 7, a flowchart of an operation for deriving optimal ambiance conditions is depicted in accordance with an illustrative embodiment of the present invention. This operation may be implemented within an ambiance optimizer, such as ambiance optimizer 610 in FIG. 6. As shown in FIG. 7, from the perspective of the ambiance optimizer, the operation begins when the physical awareness aggregation of the ambiance optimizer detects establishment characteristics from characteristics collector (step 702). The establishment characteristics that are collected in the characteristics collector are subject to change as the environment of the establishment changes. In addition to the establishment characteristics from the characteristics collector, the physical awareness aggregator may interface with properties of attributes within the establishment characteristics that have an exposed interface or a description of an interface to obtain data.

Next, the physical awareness sensor of the ambiance optimizer detects patron's presence and preferences, through a vicinity monitor or a received request from the patron, and passes this data to the optimal location analyzer (step 704). The personal preferences of the patron may be stored in preferences storage in a device that the patron is using. The optimal location analyzer of the ambiance optimizer then performs a voting algorithm based on the patron's preferences and real-time data obtained from the physical awareness aggregator (step 706). The results produced by the algorithm represent optimal locations for this patron to reside within the establishment given the current state of the environment. The optimal location analyzer then provides options of optimal locations within the establishment to a number of targets, including the patron, the host, or an external system, in any number of formats (step 708).

In one illustrative embodiment, the optimal location optimizer may feed the patron's preferences to a real-time ambiance adjuster of the ambiance optimizer to interface with the awareness characteristics object (step 710). In this case, the real-time ambiance adjuster may adjust characteristics of the environment in the establishment to tailor the environment to a state where it is tolerable to all patrons' collective attitudes (step 712), with the operation terminating thereafter.

In summary, the aspects of the present invention provides a physical space analyzer which patrons may use to determine a ranking of physical spaces that are within the range of the patron based on their preferences. In addition, the physical space analyzer augments the physical location ranking based on the patron's current attitudes towards the preferences. For example, a patron may specify a preference of not sitting near the kitchen in a restaurant, but the current attitude of not sitting near children is more important than sitting near to kitchen. The physical space analyzer can adjust physical location results at real time to provide an optimal physical space that does not have children around.

Furthermore, the aspects of the present invention provides an ambiance optimizer which establishments may use to provide options of optimal locations inside the establishment that best suit the patron's preferences. The ambiance optimizer not only provides the options to the patrons, it may also adjust the characteristics of the environment to meet the best possible conditions for the patrons. This adjustment may be made based on the preferences all patrons and current attitudes towards those preferences. In this way, the characteristics of the establishment may automatically satisfy patrons' preferences and attitudes without patrons' manual requests.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W), and digital video disc (DVD).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for deriving optimal physical space and ambiance conditions for a user, the computer implemented method comprising:
   detecting a transmitted broadcast of characteristics from a set of physical spaces within a selected distance from the user;
   producing a ranking of the set of physical spaces using the characteristics based on preferences of the user as expressed by a user profile for the user; and refining the ranking of the set of physical spaces based on dynamically input preferences of the user;
   adjusting characteristics of the selected physical space based on collective preferences of the plurality of users within the selected physical space; and
   executing a voting algorithm based on the collective preferences of the plurality of users to identify the respective optimal location options; and sending the respective optimal location options to a plurality of devices.

2. The computer implemented method of claim 1, wherein the detecting, producing, and refining steps are performed by a physical space analyzer within a device of the user.

3. The computer implemented method of claim 1, wherein the characteristics of the set of physical spaces include at least one of architectural characteristics, design characteristics, or current physical state of the set of physical spaces.

4. The computer implemented method of claim 1, wherein producing a ranking of the set of physical spaces includes the optimal physical space.

5. The computer implemented method of claim 1, further comprising:
   determining a user location of the user, wherein the user location is used to filter and rank the set of physical spaces.

6. The computer implemented method of claim 1, further comprising:
   receiving an offer to modify one of the set of physical spaces if the user confirms a reservation.

7. The computer implemented method of claim 1, further comprising:
   deriving respective optimal location options within a selected physical space for each of a plurality of users based on respective preferences of the plurality of users.

8. The computer implemented method of claim 7, wherein the detecting step is performed by a physical awareness aggregator of an ambiance optimizer, and wherein the detecting step further comprises:
   detecting properties of attributes of the characteristics from at least one of an interface or a description of an interface provided by other components within the selected physical space.

9. A data processing system comprising:
   a bus system;
   a communications system connected to the bus system;
   a memory connected to the bus system, wherein the memory includes a set of instructions; and
   a processing unit connected to the bus system, wherein the processing unit executes the set of instructions to detect a transmitted broadcast of characteristics from a set of physical spaces within a selected distance from the user;
   produce a ranking of the set of physical spaces using the characteristics based on preferences of the user as expressed by a user profile for the user; and refine the ranking of the set of physical spaces based on dynamically input preferences of the user;
   wherein the processing unit executes the set of instructions to adjust characteristics of the selected physical space based on collective preferences of the plurality of users within the selected physical space; and
   wherein the processing unit executes the set of instructions to execute a voting algorithm based on the collective preferences of the plurality of users to identify the respective optimal location options; and send the respective optimal location options to a plurality of devices.

10. The data processing system of claim 9, wherein the processing unit executes the set of instructions to determine a user location of the user, wherein the user location is used to filter and rank the set of physical spaces.

11. The data processing system of claim 9, wherein the processing unit executes the set of instructions to derive respective optimal location options within a selected physical space for each of a plurality of users based on respective preferences of the plurality of users.

12. A computer program product comprising:
   a computer usable storage medium having computer usable program code stored thereon for deriving optimal physical space and ambiance conditions for a user, the computer program product comprising:
   computer usable program code for detecting a transmitted broadcast of characteristics from a set of physical spaces within a selected distance from the user;
   computer usable program code for producing a ranking of the set of physical spaces using the characteristics based on preferences of the user as expressed by a user profile for the user; and
   computer usable program code for refining the ranking of the set of physical spaces based on dynamically input preferences of the user;
   computer usable program code for adjusting characteristics of the selected physical space based on collective preferences of the plurality of users within the selected physical space; and
   computer usable program code for executing a voting algorithm based on collective preferences of the plurality of users to identify the respective optimal location options; and computer usable program code for sending the respective optimal location options to a plurality of devices.

13. The computer program product of claim 12, further comprising:
   computer usable program code for determining a user location of the user, wherein the user location is used to filter and rank the set of physical spaces.

14. The computer program product of claim 12, further comprising:
   computer usable program code for deriving respective optimal location options within a selected physical space for each of a plurality of users based on respective preferences of the plurality of users.

* * * * *